United States Patent [19]

Tönnies

[11] Patent Number: 4,660,797
[45] Date of Patent: Apr. 28, 1987

[54] MOUNT FOR AN EXHAUST SYSTEM OF A MOTOR VEHICLE

[75] Inventor: Herbert Tönnies, Reinhardshagen, Fed. Rep. of Germany

[73] Assignee: WEGU Gummi- und Kunststoffwerlee Walter Drabing, Fed. Rep. of Germany

[21] Appl. No.: 805,981

[22] Filed: Dec. 5, 1985

[30] Foreign Application Priority Data

Dec. 13, 1984 [DE] Fed. Rep. of Germany ....... 3445491

[51] Int. Cl.⁴ .......................................... F16M 13/00
[52] U.S. Cl. .................................... 248/610; 180/196; 248/60; 248/613; 267/57.1 A; 267/63 A; 267/63 R; 267/141; 267/153
[58] Field of Search ............... 248/610, 611, 612, 613, 248/317, 568, 60; 267/141, 153, 63 R, 63 A, 57.1 A; 180/196

[56] References Cited

U.S. PATENT DOCUMENTS

| | | |
|---|---|---|
| 2,538,955 | 1/1951 | Efromson et al. ................. 267/140.3 |
| 2,755,056 | 7/1956 | Hutton .......................... 267/63 A X |
| 3,685,772 | 8/1972 | Giaccone ........................ 267/141.3 |
| 3,687,440 | 8/1972 | Jarret et al. ..................... 267/141 |
| 3,738,633 | 6/1973 | Pineau ........................... 267/141 |
| 3,850,418 | 11/1974 | Hipsher et al. ................. 267/63 R X |
| 4,380,324 | 4/1983 | Woesler ........................... 248/610 |
| 4,424,960 | 1/1984 | Dan et al. ....................... 267/141 X |
| 4,504,044 | 3/1985 | Shtarkman ................... 267/140.3 X |
| 4,535,976 | 8/1985 | Dan et al. ....................... 267/63 R X |
| 4,550,795 | 11/1985 | Teshima .......................... 267/141 X |

FOREIGN PATENT DOCUMENTS 2658358 3/1979 Fed. Rep. of Germany .
2534999 7/1984 France .

Primary Examiner—Ramon O. Ramirez
Attorney, Agent, or Firm—Thomas & Kennedy

[57] ABSTRACT

The mount has a metal stirrup (2) to be fixed to the vehicle base (1), a metal hanger stirrup (12) connected to the exhaust system and a spring element (4) which connects the two stirrups and is made of an elastomer material. The spring element (4), approximately in its center, has an annular, inner mount part (5) and at a distance concentrically thereto an approximately annular mount part (6) and also spring struts (7) which connect the two mount parts (5,6) and only partially fill the intermediate space. The inner mount part (5) is provided with a aperture (10) for accommodating the hanger stirrup (12). The metal stirrup (2) is provided such that it at least partially encloses the outer mount part (6) of the spring element (4).

8 Claims, 8 Drawing Figures

MOUNT FOR AN EXHAUST SYSTEM OF A MOTOR VEHICLE

The invention relates to a mount for an exhaust system of a motor vehicle having the features stated in the preamble of claim 1. An exhaust system is understood as the entirety of pipe sections, mufflers, silencers and also if necessary a catalytic converter, a charging device and the like which is flange-mounted onto the engine and is used for conducting and treating the exhaust. Such exhaust systems must be suspended in a spring-mounted manner on the base of the vehicle, with it being important that the vibrations which the exhaust system generates relative to the vehicle base and therefore the passenger compartment are isolated as efficiently as possible, so that no disturbing noises develop at and in the passenger compartment.

A mount of the abovementioned type is known from German Auslegeschrift No. 2,658,358. The mount is constructed in three parts. A metal stirrup which is to be fixed to the vehicle base is provided. On the other hand, a hanger stirrup is in each case connected to the exhaust pipe or other parts of the exhaust system. The metal stirrup and the hanger stirrup are held together by a loop-shaped or annular spring element which is made essentially of an elastomer material. The spring element has two approximately hemispherical indentations, through which are guided the ends of the metal stirrup and the hanger stirrup. The spring element is already loaded in tension in the case of static loading. For strengthening, an insert, for example of spring steel, is provided in the loop-shaped spring element. Otherwise, it has webs in its center area which can also cross one another. These webs are also essentially loaded in tension. Overstressing of the spring element of elastomer material is to be counteracted by the insert. However, it is very difficult and also expensive to make a proper connection between the insert and elastomer material. Even during the assembly, that is, when the metal stirrup and the hanger stirrup are inserted, there is a risk of the elastomer material of the spring element being damaged by the sharp edges of the stirrups or sustaining incipient cracking. Moreover, the mount does not allow for the thermal expansion of an exhaust system. When appropriately suspended, the annular spring elements take up an inclined position, resulting in unfavorable loading.

Supports are also known in other fields of technology. Thus, for example, the French Patent Application No. 2,534,999 shows a mount having an inner tube and two metal flanges surrounding this inner tube at a distance, with the intermediate space between the metal parts being filled with a spring element of elastomer material. Initial loading is to develop in the spring element during assembly of the mount, so that the elastomer material is essentially subjected to stress in the pressure region. Recesses are provided in the spring element to permit compression to take place when applying the initial load and therefore to control the resilience of the elastomer material. Such a mount is unsuitable for the suspension of an exhaust system for the reason alone that the hanger stirrup would have to be inserted with clearance into the metal inner tube, so that disturbing noises develop during exhaust movements.

The U.S. Patent Specification No. 2,538,955 shows a conically constructed mount having an inner and an outer part of metal, between which is arranged a spring element of elastomer material. The spring element has an annular inner mount part, by means of which it is connected to the inner metal part. The outer annular mount part is likewise used for connecting to the outer metal part. Between the two annular mount parts are located web-like spring struts which are conically arranged in an inclined position so that the mount, when under load, has an approximately uniform spring characteristic in all three spatial directions and can absorb corresponding loads uniformly. The spring struts have the same spoke-like cross-section and are also arranged in a regular manner around the central axis.

The object of the invention is to create a mount of the type mentioned at the beginning having a spring element of elastomer material, which spring element has a high spring elasticity in the installed condition during static loading and a progressively increasing spring temper in all directions during movement of the exhaust system.

This is achieved according to the invention by the features of claim 1. Thus the previous type of construction of mounts for exhaust systems is abandoned in principle by the stirrups no longer engaging next to one another on the spring element but, as it were, approximately concentrically to one another. This results in the compressive stressing of the spring element in the case of static loading. Moreover, the possibility emerges of using the annular intermediate space between the stirrups for the arrangement and design of the spring element in detail. Because of the web-like spring struts the spring element only partially fills this intermediate space and is on its part made in three pieces. It consists of an inner mount part, an outer mount part and the spring struts connecting the two mount parts. At the same time, therefore, the possibility is provided of allocating different functions to the individual parts of the spring element or of providing the individual parts of the spring element in an arrangement adapted to the particular application, and in a certain design, so that it is possible in this way to optimize the spring characteristics in the various spatial directions. Thus it is easily possible to design the spring struts of the spring element as a primary spring element and the two mount parts as secondary spring elements, which therefore only participate to a limited extent in the spring action. In particular, the spring struts acting as primary springs, according to their design and arrangement, can become active inside the spring element as compression, tension or spiral springs. The inner mount part directly accommodates the hanger stirrup in its penetration. Related to the installation direction and thus the direction of action in the case of static loading, the mount is constructed symmetrically to a vertical longitudinal center plane and asymmetrically to the longitudinal center plane horizontal thereto, by which means the initial position during static loading is fixed. The spring struts arranged beneath the horizontal longitudinal center plane have overall a greater cross-section than the spring struts arranged above and are already loaded in compression in the case of static loading.

The new mount also offers the advantage that it can be arranged close to the vehicle base, that is, comparatively further away from the hot parts of the exhaust system so that it itself is subjected to a comparatively lower thermal loading. Moreover, because the metal stirrup which is to be fixed to the vehicle base surrounds the spring element, it protects this spring element against the direct effect of radiant heat. The spring element can be accommodated loosely in the metal stirrup. In particular, an expensive connection of the parts by vulcanization is therefore unnecessary. Because of its three-piece construction, the spring element is able to absorb or to isolate in damping manner vibrations in the range of 1 to 3 Hz, as are typical of the natural frequency of the vehicle body, through axle frequencies in the magnitude of 8 to 30 Hz up to high frequencies of engine vibrations up to about 1,000 Hz. Thus the vibrations are kept away from the base plate of the body, which results in a reduced transmission of noises into the passenger compartment. At the same time, as a result of the approximately concentric arrangement of the metal stirrup around the spring element, the possibility is created of limiting in the manner of a stop the vibration amplitudes in the various directions of movement, so that, in the case of a low-lying vehicle base, an arching for the movements of the exhaust system can be made comparatively smaller. Because of its design, the new mount also permits the exhaust system to expand and contract in the axial direction as a result of thermal action without the spring element being consequently loaded. For this purpose, the hanger stirrups need only be made slightly longer than the axial extension of the spring element.

The mount is also advantageous in as much as it facilitates and shortens the assembly of the exhaust system on the motor vehicle. It enables automatic assembly of the exhaust system under the vehicle base or on the prime mover. The mount permits changes in length of the exhaust system under thermal action, and in fact without the loading on the spring element consequently changing. During loading, mixed compressive, bending and shearing stresses are caused in the spring element, in particular in the spring struts, that is, such stresses which the elastomer material can efficiently absorb and which are in opposition to the pure tensile stress, by means of which rings, loops or suchlike known mounts were previously loaded; this also results in a longer life of the new mount. The spring element can be held in the metal stirrup under initial loading at least in one direction. The spring element can also be expediently installed under initial loading in all directions, so that the elastomer material, for example rubber, of the spring element is essentially only loaded in compression. In contrast to a tensile load, a compressive load—in the case of such materials—is always of advantage for a long life.

The outer, approximately annular mount part can have a round, square or rectangular or another adapted form. This depends on the application in particular and on the spring characteristics for the corresponding movements, which spring characteristics may possibly be different in the various directions. In the case of a circular configuration, the spring characteristics in the various spatial directions will not differ too much from one another, whereas quite relevant differences are present in the case of a square or rectangular design, because the main loading direction is vertical. If the outer mount part has an anchoring rib on its surface facing toward the metal stirrup, it is thereby possible to hold the spring element in a groove of the metal stirrup. The expensive manufacture of a metal/rubber connection is dispensed with. Moreover, the advantage results that the spring element is formed as an individual part such that it is interchangeable with respect to the metal stirrup. Thus spring elements of rubber, for example of different Shore hardness, in connection with the identically designed metal stirrup, can also be used for various exhaust systems. It is of course also possible to provide the rib on the metal stirrup and to have the rib engage into a groove on the spring element. By this means, however, the design of the metal stirrup becomes slightly more complicated.

As a rule, the spring struts connect the two mount parts of the spring element to one another in each case individually. However, starting individually from the outer mount part, they can also be brought together in the area of the inner mount part and merge together into the inner mount part. In the lower area, it is advisable to make a bridge on the spring element; that is, the spring struts complement one another bridge-like. This ensures that these spring struts are essentially only loaded in compression/shear stress. The initial spring rate of the spring elements shows a higher value, and then takes on a lower spring rate value in the area of the static load. Finally, an area follows with a reincreased spring rate value. The use of a spring having a linear characteristic, in the case of the same spring deflection, would produce a substantially higher spring rate value and therefore a poorer isolating effect. Between the spring struts, clearance spaces are formed between the two mount parts. These clearance spaces are adapted in their size to the particular application and enable the inner mount part to be guided comparatively smoothly via the spring struts relative to the outer mount part. On the other hand, stop bulges which limit the spring deflection of the inner mount part relative to the outer mount part can be provided on the inner side of the outer mount part or on the outer side of the inner mount part, which stop bulges limit the particular spring deflection and thus act as mechanical stop pads. The separate arrangement of stop pads is dispensed with.

The inner mount part can have a larger width than the outer mount part in the axial direction. This feature is advisable if a comparatively low surface pressure is desired or is necessary between the hanger stirrup and the inner mount part.

The invention is described further with reference to several illustrative embodiments, in which.

Figure 1:
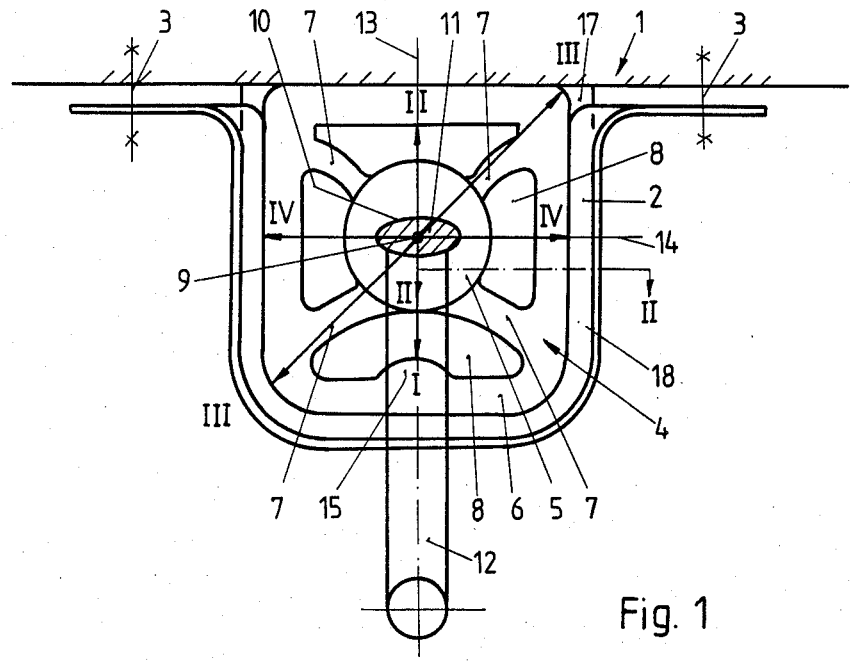
FIG. 1 shows a side view of a first embodiment of the mount.
Figure 6:
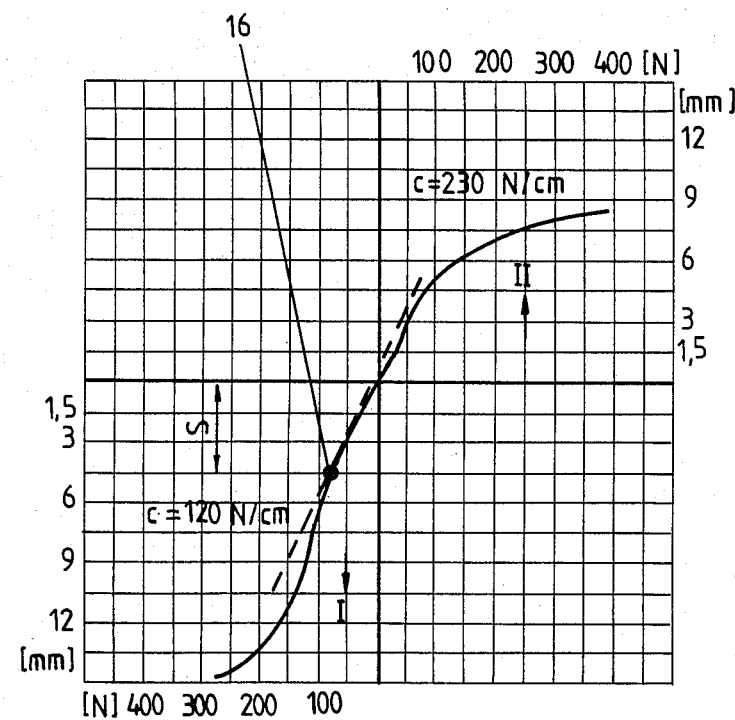
Figure 7:
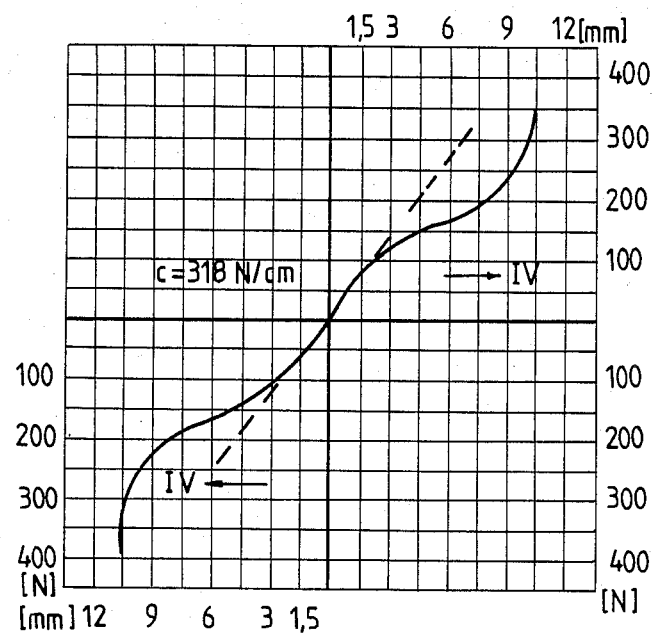
Figure 8:
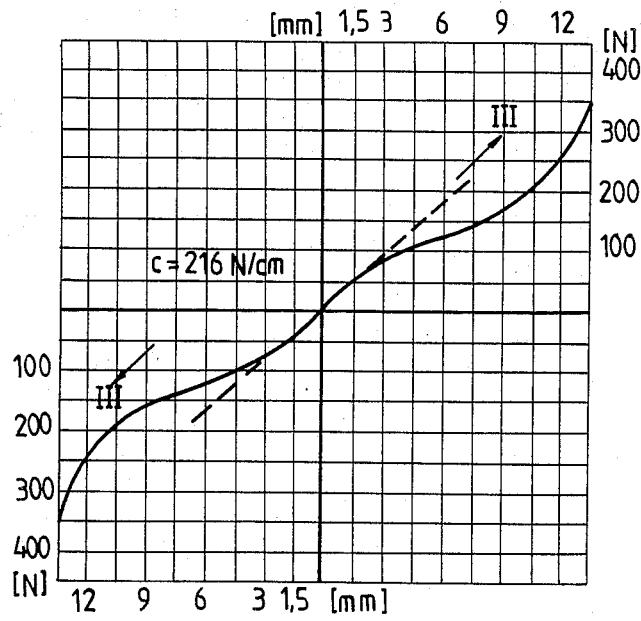

FIG. 6 shows a diagram of the spring characteristic of the mount according to FIG. 1 for the vertical inward and outward spring deflection, FIG. 7 shows a diagram of the spring characteristic of the mount according to FIG. 1 for the horizontal innward and outward spring deflection, and FIG. 8 shows a diagram of the spring characteristic of the mount according to FIG. 1 for the diagonal inward and outward spring deflection.

Figure 5:
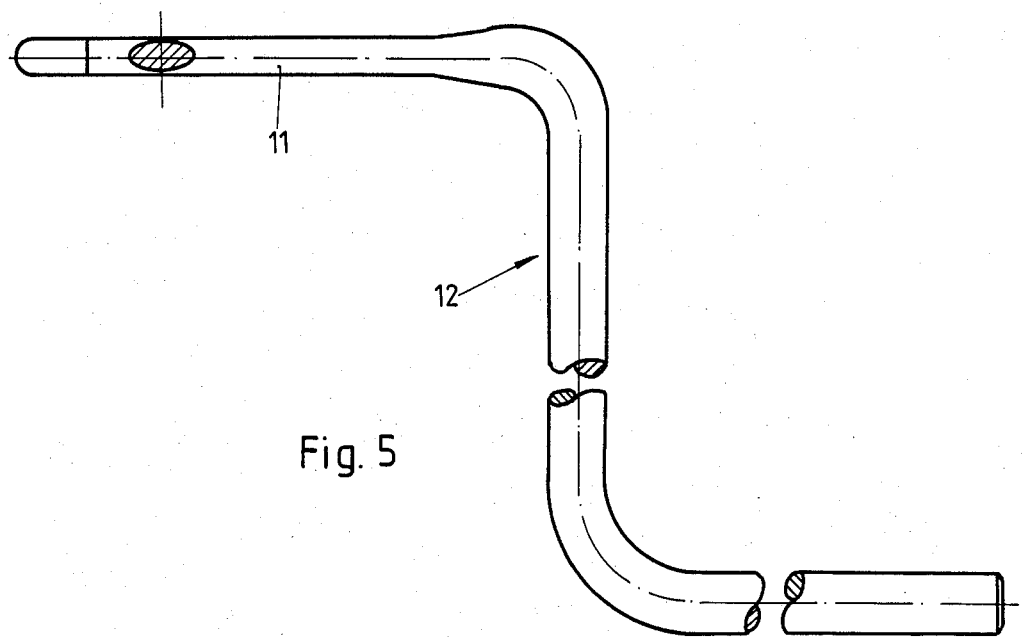
FIG. 5 shows a side view of the hanger stirrup.

In FIG. 1, a vehicle base 1 to which a mount is to be fixed is indicated schematically. FIG. 1 shows a view of the mount in the travel direction, that is, in the longitudinal direction of the vehicle. A metal stirrup 2 is fixed to the vehicle base 1 transversely to the travel direction by means of schematically indicated bolts 3. The metal stirrup 2 pertains to the mount and has an approximately U-shaped configuration, by means of which it encloses, if possible on all sides, a spring element 4 of rubber or another elastomer material. FIG. 1 shows the installed situation before the bolts are tightened, so that it can be recognized that the spring element 4 is provided such that it protrudes relative to the seating surface of the metal stirrup 2, so that the spring element 4 in the metal stirrup 2 is pressed in or accommodated under initial loading by the tightening of the bolts 3. The spring element 4 is a coherent body, but is functionally divided into three parts and therefore consists of an inner mount part 5, an outer mount part 6 and intermediately arranged spring struts 7. It becomes recognizable that the inner mount part 5 and the outer mount part 6 are arranged at a distance from one another, that is, an intermediate space is formed which is in turn subdivided into several clearance spaces 8 by the spring struts 7. The spring element 4 has an axis 9 which is arranged parallel to the vehicle's longitudinal axis. As can be recognized from the representation, the inner mount part 5, in the direction of the axis 9, has a greater extension that the outer mount part 6. The inner mount part 5 and also the outer mount part 6 are arranged or made concentric to the axis 9. Here, the inner mount part 5 consists of an approximately circularly defined piece of material and has in its inside a penetration 10 which is provided such that it is continuous in the axial direction, so that the free end 11 of a hanger stirrup 12 can be inserted here. The hanger stirrup 12 is shown again, in side view, in FIG. 5 and is otherwise connected to the exhaust unit (not shown) for example by a weldment or a clamping collar. As can be seen, the aperture 10 of the inner mount part 5 and also the free end 11 of the hanger stirrup 12 can have an elliptical cross-section adapted to one another, so that the parts are held against one another with a certain positive closure. Here, the spring element 4 is made symmetric to a vertical longitudinal center plane 13 and asymmetric to a horizontal longitudinal center plane 14. It can be seen how the two spring struts 7 arranged above the horizontal longitudinal center plane 14 have a comparatively thinner cross-section and in each case emerge from the outer mount part 6 and merge into the inner mount part 5, with appropriate transition radii being provided for reducing notch stresses. On the other hand, the two spring struts 7 arranged beneath the horizontal longitudinal center plane 14 have a larger cross-section and also merge into one another at the transition point to the inner mount part 5. They form as it were a bridge, on which the inner mount part 5 is supported. It can be recognized that these spring struts 7 are loaded in compression during static loading in the initial position and also during inward spring deflection in the direction I, which is advantageous. In this inward spring deflection direction I, the outer mount part 6 has a stop bulge 15 which limits the amplitude of possible movement in this direction. The remaining spatial directions are also represented by Roman numerals. Thus the outward spring deflection direction is designated as II. Diagonal movements take place in the direction of the double arrows III, whereas horizontal movements take place according to the double arrow IV. These double arrows relate to the spring characteristics in the various directions, which spring characteristics are shown in FIGS. 6 to 8, with the forces which act as a result of the static and dynamic loading being shown over the spring deflection. FIG. 6 also shows the initial position 16, that is, the inward spring deflection of the inner mount part 5 relative to the outer mount part 6 during static loading, that is, when the exhaust system is assembled. From the diagrams of FIGS. 6 to 8, however, not only can the spring characteristics be seen but also the stop action, that is, the limiting of the respective spring deflections by the outer mount part 6 or the metal stirrup 2.

Figure 2:
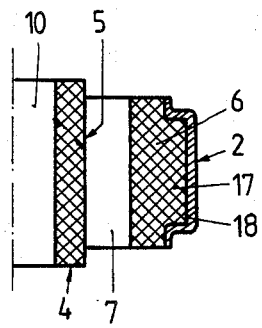
FIG. 2 shows a section along II—II in FIG. 1.
Figure 3:
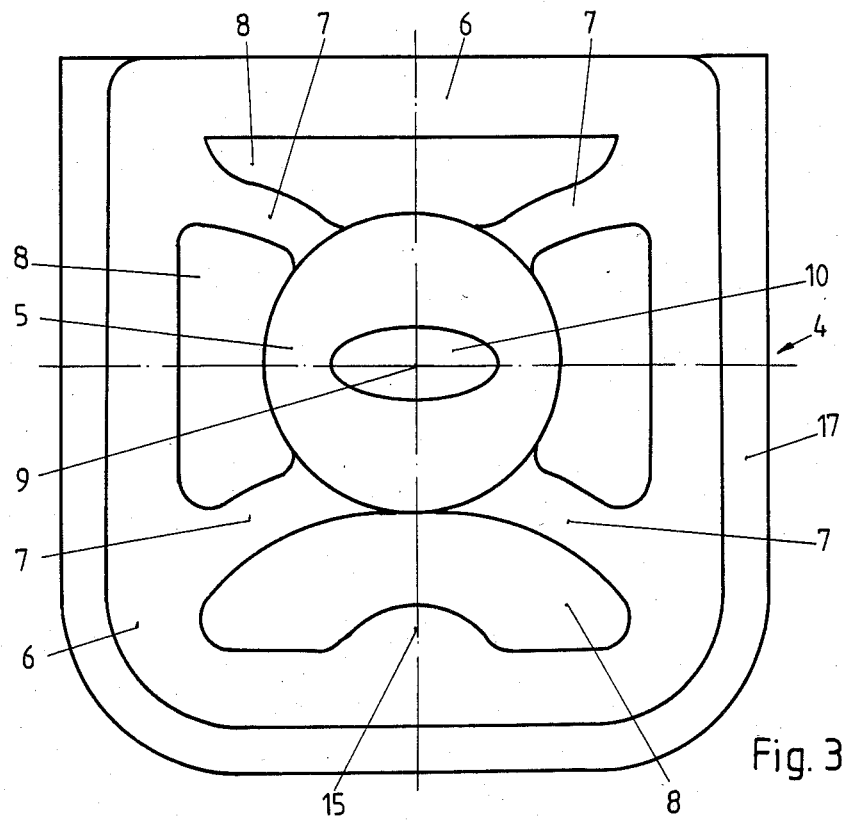
FIG. 3 shows the representation of the spring element to an enlarged scale.

As FIGS. 2 and 3 especially show, the spring element 4 has a reinforcing rib 17. The metal stirrup 2 accordingly has a groove 18, so that the spring element 4, especially when it is installed under initial loading, is held in location in the direction of the axis 9 by the metal stirrup 2. The hanger stirrup 12, on the other hand, can be displaced with its free end 11 in the aperture 10 and therefore in the direction of the axis 9. Depending on the thermal expansion of the exhaust system, this displacement path can be several centimeters, so that the free end 11 is formed correspondingly longer than the extension of the inner mount part 5 in the direction of the axis 9.

FIG. 3 shows a side view of the spring element 4 in an enlarged representation. It can easily be seen how, on the one hand, the elliptical configuration of the aperture 10 forms a large seating surface for the free end 11 of the hanger stirrup 12 and, on the other hand, the parts come into positive active engagement with one another, so that, for example in an eccentric arrangement of the mount to the pipe of the exhaust system, a certain torsional movement is also possible. Otherwise, the mount makes possible movement in the most various axes of freedom. The exhaust system can be moved axially or radially relative to the mount. Even tilted movement is possible, and in fact in various directions. Of course, the overall movement is determined by the configuration of the exhaust system per se and by the arrangement of the suspension points, with such a mount being provided at each suspension point.

Figure 4:
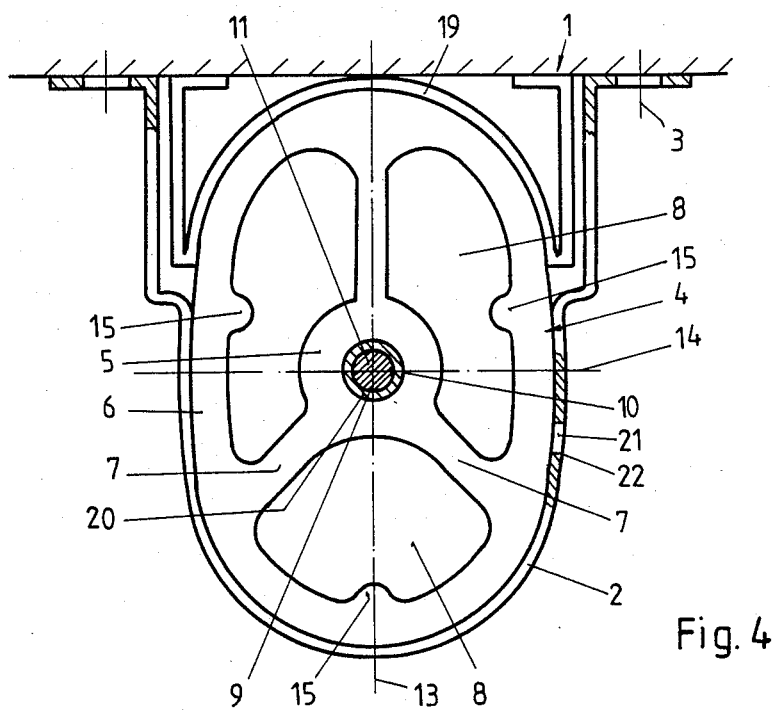
FIG. 4 shows the representation of the mount in a second embodiment.

It can be seen that the metal stirrup 2 and, adapted, the spring element 4 can have a quite different form, for example an approximately circular shape or also a rectangular design or also an approximately square configuration, as is shown, for example, by FIG. 1. FIG. 4 shows an elliptical design, with the main axis of the ellipse being arranged perpendicularly, that is, in the vertical longitudinal center plane 13. As a result of this design, greater spring deflections are permitted in the vertical direction than in the horizontal direction. Here, the metal stirrup 2 is supplemented by an auxiliary stirrup 19. Here, the inner mount part 5 has a round aperture of greater inside diameter than the outside diameter of the free end 11 of the hanger stirrup 12, which is also made circular here. In the intermediate space thus obtained, a sleeve 20, made for example of a plastic which is a poor heat conductor, is pushed in, so that the hanger stirrup 12, which of course is in conductive connection with the hot exhaust system, is held in thermally insulated manner relative to the spring element 4. The spring element 4 can be accommodated by or connected to the stirrup 2 in various manner. Here, instead of the reinforcing rib 17 and the groove 18, anchoring knobs 21 are integrally formed on the outer periphery of the outer mount part 6, which anchoring knobs 21 engage into corresponding recesses 22 of the metal stirrup 2, so that in this way, especially if the spring element 4 is installed under initial compressive loading, reliable fixing is achieved on the metal stirrup 2 in the direction of the axis 9.

I claim:

1. A mount for an exhaust system of a motor vehicle, having a U-shaped stirrup (2) to be fixed to the vehicle base (1) and a sound-insulating and vibration-isolating spring element (4) positioned in said U-shaped stirrup for receiving and supporting a metal hanger stirrup (12) connected to the exhaust system of the vehicle, said spring element being made of an elastomer material wherein the spring element (4) has an annular inner mount part (5) and at a distance therefrom an approximately annular outer mount part (6) and web-like spring struts (7) connecting the two mount parts (5,6), wherein the inner mount part (5) is provided with an aperture (10) for accommodating the hanger stirrup (12), wherein the space defined by said U-shaped stirrup (2) is initially of a size smaller than said spring element such that said U-shaped stirrup at least partially compresses the outer mount part (6) of said spring element (4) and compresses said spring element against the vehicle base (1), wherein the inner mount part (5) with its aperture (10) is provided on the spring element (4) symmetrically to the vertical longitudinal center plane (13) in the installed condition of the mount and asymetrically to the longitudinal center plane (14) horizontal thereto, and wherein the spring struts (7) arranged beneath the horizontal longitudinal center plane (14) have overall a greater cross-section than the spring struts arranged above.

2. A mount as claimed in claim 1, wherein the spring element (4) is held in the U-shaped stirrup (2) under initial loading at least in one direction.

3. A mount as claimed in claim 1 wherein the outer mount part (6) has an anchoring rib (17) on its surface facing toward the U-shaped stirrup (2) by means of which anchoring rib (17) it is held in a groove (18) of the U-shaped stirrup (2).

4. A mount as claimed in claim 1, wherein the spring struts (7), starting individually from the outer mount part (6), are brought together in the area of the inner mount part (5) and merge together into the inner mount part (5).

5. A mount as claimed in claim 1, wherein a stop bulge (15) which limits the spring deflection of the inner mount part (5) relative to the outer mount part (6) is provided between the outer mount part (6) and the outer side of the inner mount part (5).

6. A mount as claimed in claim 1, wherein the spring struts (7) have an approximately constant cross-section in each case along their extension between the two mount parts (5,6).

7. A mount as claimed in claim 1, wherein the inner mount part (5) has a larger width than the outer mount part (6) in the axial direction.

8. A mount for an exhaust system of a motor vehicle including
 a U-shaped hangar stirrup (2) for attachment at the upper end portions of its side legs to a flat surface of the vehicle,
 a compressible sound-insulating and vibration-isolating spring element (4) positioned within said U-shaped stirrup initially of a size larger than the space defined by said stirrup so that said spring element is compressed when positioned in said stirrup and the upper end portions of said stirrup are attached to the flat surface of the vehicle,
 said spring element comprising an elastomer material including an approximately annular inner most part (5) defining a centrally positioned opening (10) therethrough and an approximately annular outer mount part (6) spaced from and surrounding said inner mount part,
 a plurality of web-like spring struts (7) extending approximately radially between and connected at their end portions to said inner mount part and said outer mount part and supporting said inner mount part centrally within said outer mount part, said spring struts being circumferentially spaced about said inner mount part with one pair of said spring struts extending downwardly and diverging outwardly in opposite directions from said inner mount part, and with at least one of said spring struts extending upwardly from said inner mount part, said downwardly extending spring struts having overall a greater cross-sectional area than the upwardly extending spring struts.

* * * * *